United States Patent [19]

Bons et al.

[11] Patent Number: 4,598,744
[45] Date of Patent: Jul. 8, 1986

[54] UNIVERSAL MACHINE FOR WOOD AND/OR SYNTHETIC PLASTIC WORKING

[75] Inventors: Antonie Bons, Hameln; Erwin Raabe, Hess.-Oldendorf, both of Fed. Rep. of Germany

[73] Assignee: Stephan-Werke GmbH, Hameln, Fed. Rep. of Germany

[21] Appl. No.: 589,451

[22] Filed: Mar. 12, 1984

[30] Foreign Application Priority Data

Mar. 14, 1983 [DE] Fed. Rep. of Germany ....... 3309025

[51] Int. Cl.$^4$ ............................................. B27C 9/00
[52] U.S. Cl. .................... 144/1 G; 29/27 A; 29/560; 144/1 H; 144/35 R; 408/21
[58] Field of Search ............. 144/1 R, 1 G, 1 H, 35 R, 144/3 R, 35 A; 408/20, 21; 29/26 A, 560, 27 A, 28, 565

[56] References Cited

U.S. PATENT DOCUMENTS

| 3,771,579 | 11/1973 | Heuze | 144/1 G |
| 3,815,647 | 6/1974 | Piemont | 144/1 G |
| 4,401,142 | 8/1983 | Linossi | 144/1 R |
| 4,497,100 | 2/1985 | Wagner | 29/27 A |

*Primary Examiner*—W. D. Bray
*Attorney, Agent, or Firm*—Michael J. Striker

[57] ABSTRACT

A universal machine for the wood and/or synthetic plastic working has a base model for mounting of various working aggregates which can also be used as independent working aggregates, and includes a working motor supported in a height-adjusting device inside a machine housing and having a motor shaft whose ends are formed as working spindles, wherein said working motor is turnable by a turning device from a horizontal position to a vertical position, and a machine housing which surrounds the working motor at its all sides has a plurality of fixedly integrated horizontal mounting surfaces for the working aggregate.

37 Claims, 38 Drawing Figures

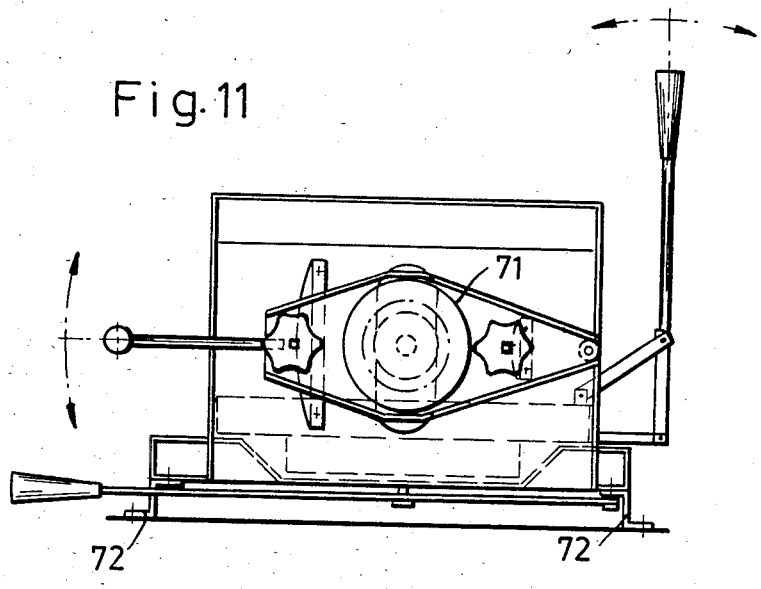
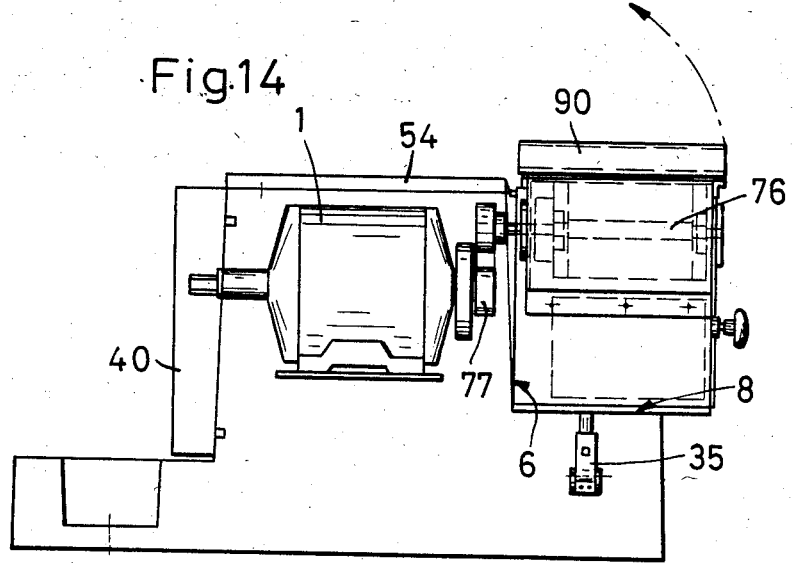

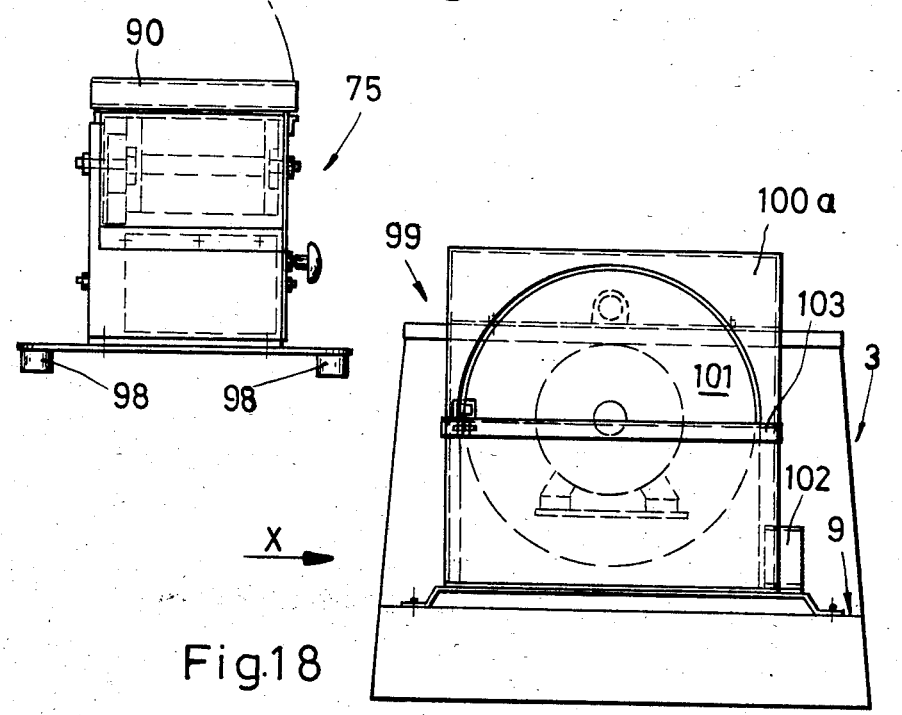
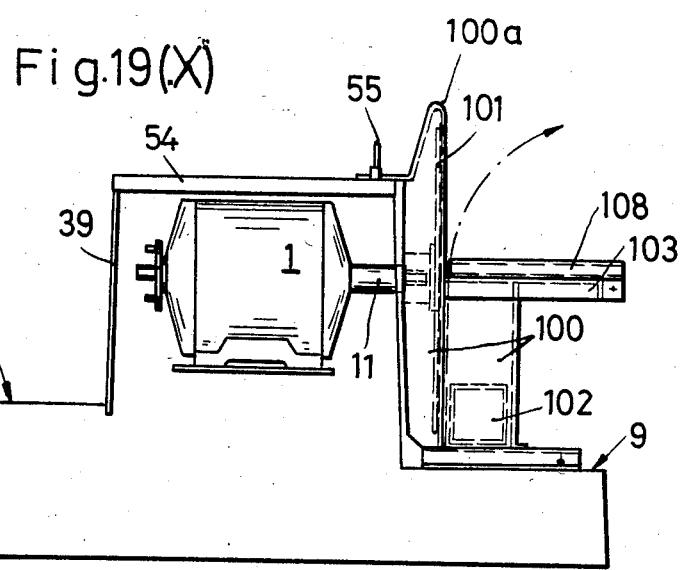

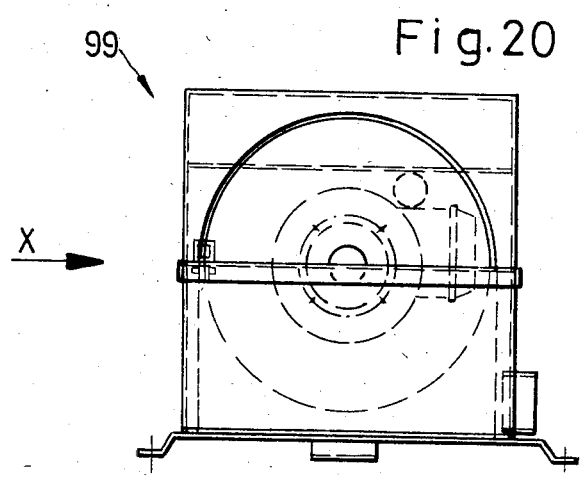
Fig.20
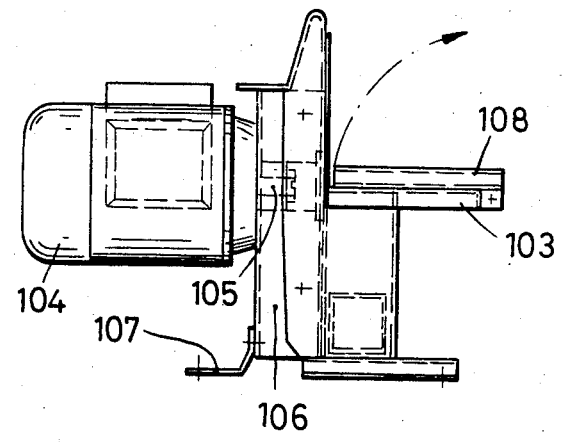
Fig.21 ("X")

UNIVERSAL MACHINE FOR WOOD AND/OR SYNTHETIC PLASTIC WORKING

BACKGROUND OF THE INVENTION

The present invention relates to a universal machine for wood and/or synthetic plastic working. More particularly it relates to a universal machine which has a working motor supported in a height-adjusting device inside a machine housing and having a motor shaft with ends formed as working spindles, wherein the working motor is turnable by a turning device from its horizontal position to its vertical position.

Such universal machines are known in the art and designed first of all for the home use, for a mobile workshop, etc. Numerous constructions are available on the market which, however, possess some disadvantages. They are provided with several working motors which lead to a considerable increase of the prime cost for such a machine. The base model incorporates a predetermined working machine, for example, a thickness planing device on which different auxiliary aggregates must be mounted. This concept leads to compromises. For example the conversion of the abovementioned thickness planing device to a circular saw requires lateral mounting of an additional table. This in turn requires an additional working space and leads as a rule to complicated mounting construction which affect the manufacturing accuracy.

One of such universal machines is disclosed in the French Pat. No. 1,594,086. Here the working motor is constantly equipped with a circular saw, whereas the other working spindle of the working motor can be used for a belt drive. This working spindle does not extend in any position of the working motor over the machine housing. Always, an intermediate element must be provided which receives the proper working spindle for the tool. A planing shaft is constantly provided and equipped at its one end with a drill and its other end with a mill holder. All these tools are therefore installed permanently. Covers for the tools not in use are not provided. The abovementioned drill does not have for example a drill advancing, workpiece guiding and holding devices. A workpiece to be drilled must be pressed by hand against the drill. The machine housing which is open at its sides is closed at its upper side by a sawing and milling table which is turnable into an approximately vertical position. This sawing and milling table has two openings provided for passage of the saw, the planing shaft and the milling holder. Further, a small table is articulately connected with the machine housing and turnable in a horizontal plane. Moreover, a further small table can be pulled from the machine housing. Both these tables lie in their working position parallel near one another. The machine housing does not have throughgoing openings for the ends of the motor shaft of the working motor.

SUMMARY OF THE INVENTION

Accordingly, it is an object of the present invention to provide a universal machine of the abovementioned type which avoids the disadvantages of the prior art.

More particularly, it is an object of the present invention to provide a universal machine of the abovementioned type, which has only one working motor, allows a simple and fast conversion, and despite of a very small working space consumption makes possible a high manufacturing precision.

In keeping with these objects and with others which will become apparent hereinafter, one feature of the present invention resides, briefly stated, in a universal machine which has a machine housing surrounding a working motor and having a first horizontal mounting surface, which limits the machine housing from above, two opposite first lateral walls, a second outwardly extending horizontal mounting surface and a third outwardly extending horizontal mounting surface associated with the lateral walls and located deeper than the first horizontal mounting surface, so that the three mounting surfaces form integral components of the machine housing, the lateral walls associated with the first mounting surface and the third mounting surface are provided with throughgoing openings through which one working spindle of the working motor extends in a vertical or a horizontal position of the working motor, the lateral wall facing toward the second mounting surface has another throughgoing opening which is in alignment with the other horizontally lying working spindle, and at least first and second mounting surfaces are provided with centering elements for releasable receipt of a protective hood as well as at least one exchangeable independent working device.

It is advantageous when the protective hood has a cover plate lying on the first mounting surface and covers for the throughgoing openings not required for the respective working devices or for the working spindle extending through such openings.

When the universal machine is designed in accordance with the present invention, it provides three-side mounting possibilities for the working machines. Thereby additional working tables and the like for lateral mounting are completely dispensed with. At least the first and second mounting surfaces can be provided with vertical centering pins, whereas the second and third mounting surfaces can be provided with vertical depressions with bottom holes.

The machine housing can have a lower cover as well as a suction pipe for a dust and chip withdrawal located thereabove. The suction can be performed for example by a conventional floor vacuum cleaner.

The height adjusting device for the working motor can include two synchronously driven vertical spindles arranged in in the region of the two lateral walls, and two parallel guide rods on which a motor receiving member is height-adjustable. This construction is especially favorable with consideration of the warp protection than the known constructions provided with height adjustment about a lateral axis. The inventive height-adjusting device for the working motor can have a horizontal turning axle located normally to the motor shaft, so as to steplessly turn the working motor by at least 135° and arrest the same in a desired turning position. The working motor can be vertically displaced in a turned position.

The working spindle which in the vertical position of the motor shaft extends through the first mounting surface is, for example, supported in a reinforced bearing bracket with a reinforced support, so as unobjectionably absorb forces which take place for example during milling.

A sawing and milling table can be releasably mounted on the first mounting surface, for example, by snap closures and provided with changeable throughgoing openings for the working spindle, the circular saw blade, or a milling tool. In an especially advantageous manner, the sawing and milling tool has a cover for the openings associated with the circular saw blade or for the circular segment-shaped recess, and a cover for the working spindle extending through the opposite lateral wall. With simple placement of the sawing and milling on the first mounting surface, covering of the dangerous region is performed automatically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 11 is an end view from the left of the elongated hole drilling device of FIG. 9;

FIG. 14 is a view showing a section of the base model shown in FIG. 12;

FIG. 17 is a view showing a section of the belt grinder of FIG. 15;

FIG. 18 is a side view of a disc grinder mounted on the base model;

FIG. 19 is a view showing the base model of FIG. 18, as see in the direction X;

FIG. 20 is the disc grinder of FIG. 18 formed as an independent working aggregate with its own drive;

FIG. 21 is a view showing the disc grinder of FIG. 20 as seen in the direction of the arrow X;

DESCRIPTION OF A PREFERRED EMBODIMENT

Figure 1:
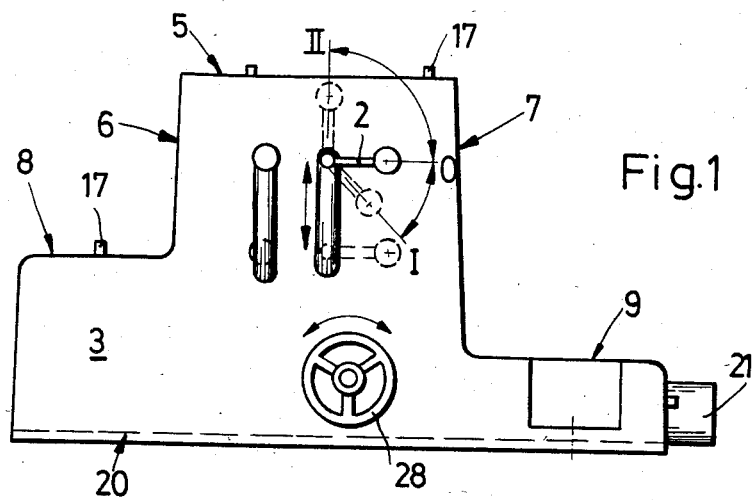
FIG. 1 is a lateral view of a base model of a universal machine.
Figure 2:
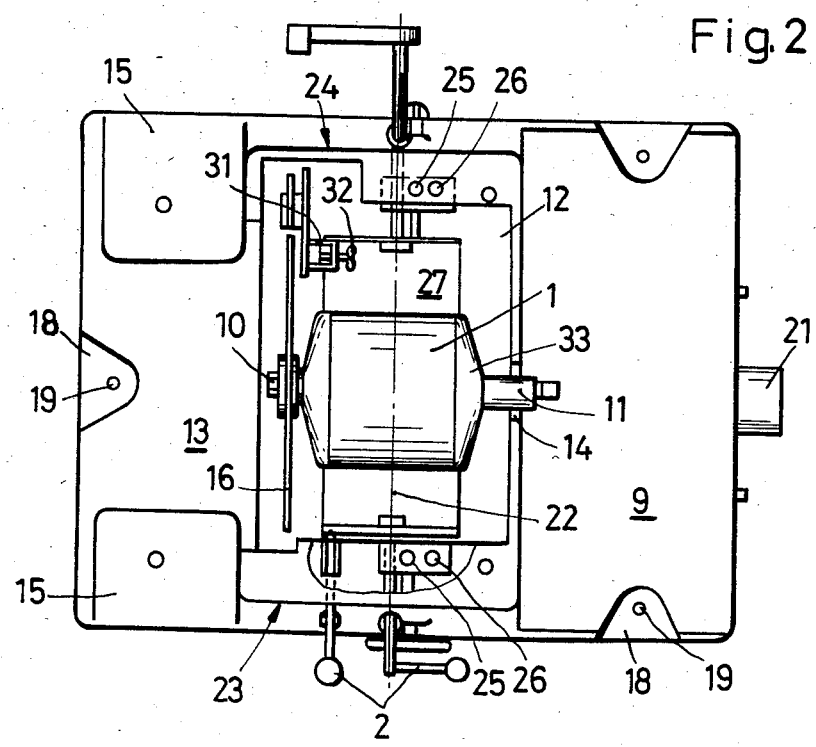
FIG. 2 is a plan view of the base model of FIG. 1.

A universal machine in accordance with the present invention has a base model shown in FIGS. 1 and 2 and including a working motor 1 which is turnable with its motor shaft by a turning device 2 from a horizontal position to a vertical position. A machine housing 3 surrounds the working motor 1 on all sides, and the working motor 1 is supported in the machine housing, in the turning device 2 and in a height-adjusting device 4, as can be seen from FIG. 3. The machine housing 3 is limited from above by a first horizontal mounting surface 5 for mounting exchangeable working devices. It also has at two opposite first lateral walls 6 and 7, a second mounting surface 8 and a third mounting surface 9 which are located deeper and extend outwardly. The second mounting surface 8 is located higher than the third mounting surface 9.

Both ends of the motor shaft of the working motor 1 are formed as working spindles 10 and 11, respectively. The first mounting surface 5 and both first lateral walls 6 and 7 are provided with throughgoing openings 12, 13, 14 respectively, for the working spindle 10 and 11. The secOnd mounting surface 8 has two surface portions 15. A recess formed as a circular segment is provided between the two surface portions 15 and serves as the throughgoing opening 13 in the associated lateral wall 6 for receiving a circular saw blade 16.

The first, second and third mounting surfaces 5, 8, 9 are provided with vertical centering pins 17, whereas the second and third mounting surfaces 8 and 9 have vertical depressions 18 with bottom holes 19. In the lateral wall 7 associated with the third mounting surface 9, the throughgoing opnening 14 for the working spindle 11 is formed as a vertical elongated hole.

The machine housing 3 is composed of a double synthetic plastic shell, with a synthetic plastic material foamed therebetween and has a lower cover 20, as well as a suction pipe 21 for a dust and chips withdrawal located thereabove.

The turning device 2 for the working motor 1 has a horizontal turning axle 22 located normal to the motor shaft so that the working motor rotates steplessly about the turning axis axle by at least 135° and is arrested in the desired turning position O-I and II.

Figure 3:
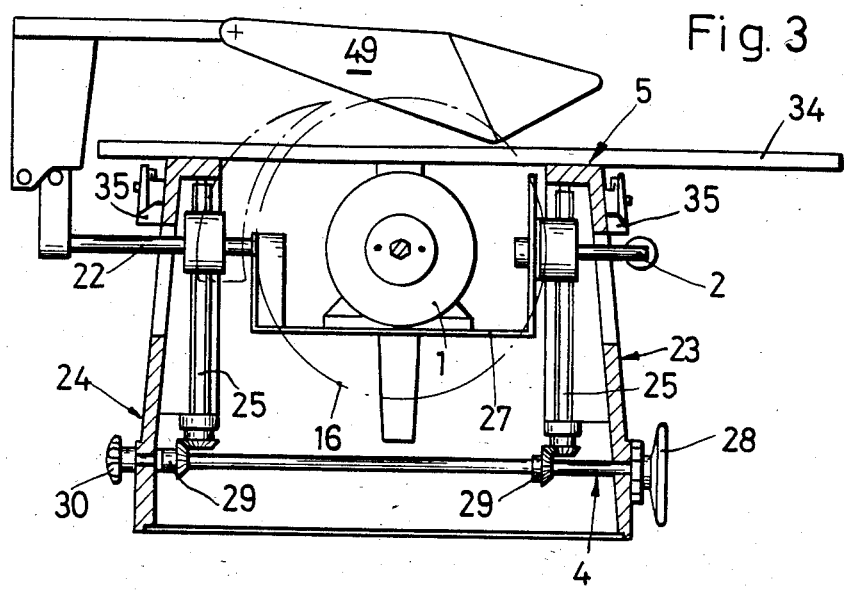
FIG. 3 is a view showing the base model provided with a sawing and milling tool, in longitudinal section and in a position which is turned relative to FIG. 1 by 90°.

The vertically adjusting device 4 for the working motor 1 shown in FIG. 3 has two synchronously driven vertical spindles 25 arranged in the region of the two lateral walls 23 and 24 and also two parallel guide rods 26 on which a motor receiving member 27 can be vertically adjustably guided. The drive of both vertical spindles 25 is performed by a hand wheel 28 supported in the lateral wall 23 and two bevel gear 29. The working motor 1 can be fixed in its respective vertical position by actuation of a clamping hand wheel 30. The motor receiving element 27 has a guide tube 31. A slotted wedge holder is releasably received in the guide tube 31 and blocked by a clamping screw 32. Thereby the gap wedge holder can be completely dismounted and mounted.

FIGS. 3–6 show a sawing and milling table 34. It is releasably mounted by snap closures and has changeable throughgoing openings 36 and 37 for the working spindle 11, the circular saw blade 16 or a milling tool 38. Further, a cover 39 is provided for the throughgoing opening 13 associated with the circular saw blade 13 or circular segment-shaped recess, and a cover 40 is provided for the working spindle 11 extending outwardly of the opposite lateral wall 7. The sawing and milling table 34 has a turnable upper cover 49 for the circular saw blade 16, which is turnable about a horizontal longitudinal axis 22 for correspondence to a respective inclined position of the circular saw blade.

Figure 4:
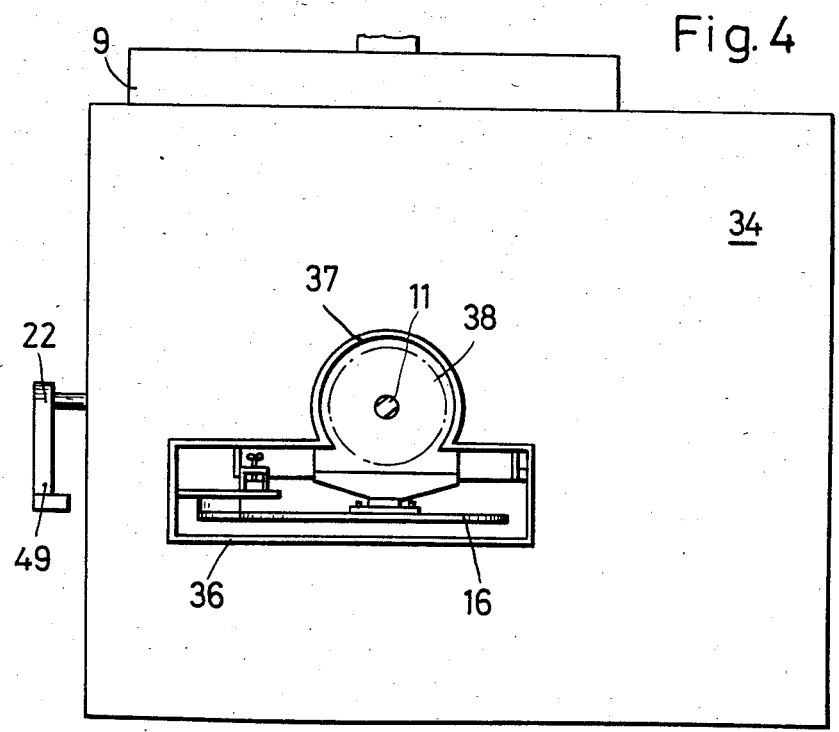
FIG. 4 is a plan view of the base model shown in FIG. 3.
Figure 5:
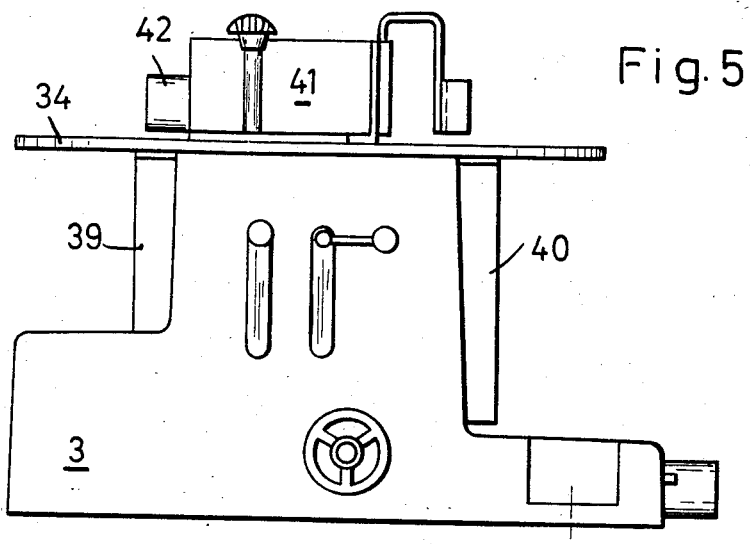
FIG. 5 is a view showing the base model substantially corresponding to that FIG. 1, but with a mounted sawing and milling tool and a mill protective hood.
Figure 6:
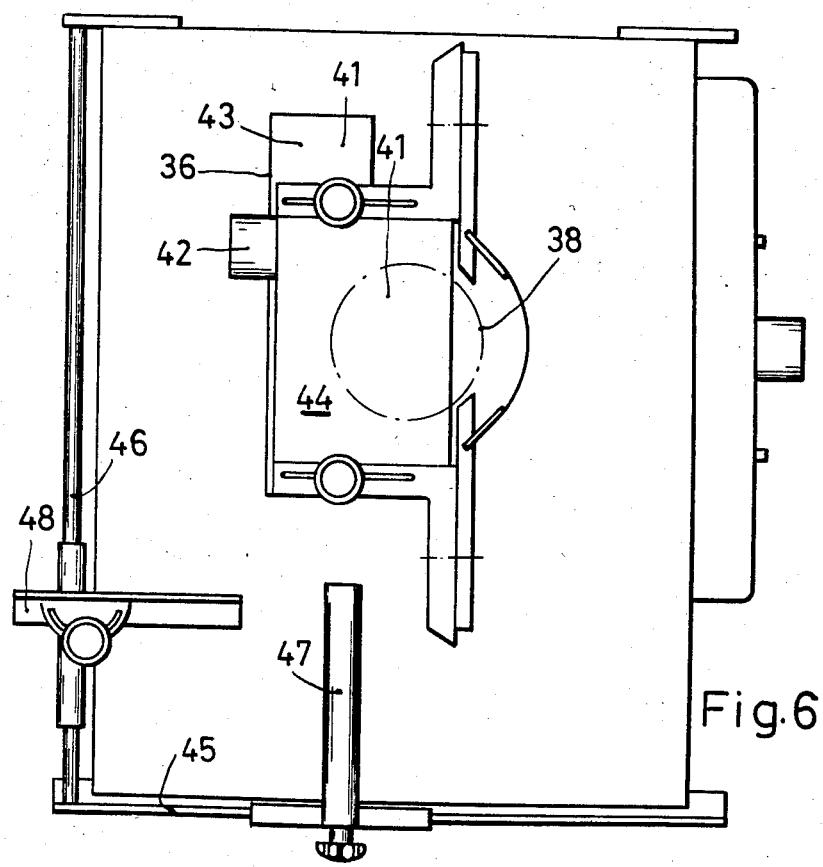
FIG. 6 is a plan view of the base model shown in FIG. 5.

As can be seen from FIGS. 4 and 6, a mill protective hood 41 can be releasably mounted on the sawing and milling table 34. The hood 41 has a suction pipe 42 for dust and chips withdrawal and is fitted with a lower hood part 43 in a throughgoing opening 36 of the sawing and milling table 34. It also has an upper hood part 44 which is turnable relative to the lower hood part 43 for adjustment relative to the milling tool 38.

FIG. 6 shows that the sawing and milling table 34 has a receiver 45 for a parallel stop 47 and a guide 46 for a miter ruler 48.

Figure 7:
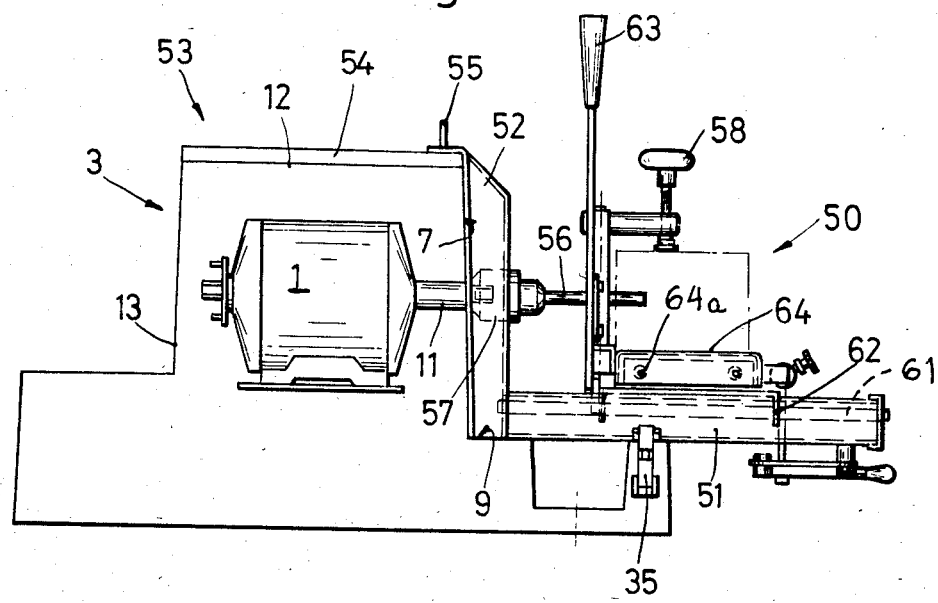
FIG. 7 is a side view of the base model with an elongated hole drilling device mounted thereon, partially in a longitudinal section.

FIG. 7 schematically shows that the base model of FIGS. 1 and 2 has an elongated hole drilling device 50 mounted thereon. This device lies with a console 51 on a third mounting surface 9 of the base model.

A protective hood 53 is further provided. It abuts with an upper cover plate 54 on the first mounting surface 5 and is held in its position by the centering pins 17. The upper throughgoing opening 12 and the lateral throughgoing openings 13 of the machine housing 3 are closed by not visible covers. A hood 52 overlaps the upper cover plate 54 of the protective hood 53 and is releasably locked here by a member 55. This releasable locking can be performed for example by one or several clamp handles which are rototably supported in the upper side of the upper cover plate 54 and extend through recesses in the overlapping part of the hood 52. A drill chuck 57 which receives a drill 56 is mounted on the horizontally located working spindle 11 of the working motor 1 and extends through respective recesses in the hood 52. A cross carriage 59 provided with a workpiece clamp 58 is arranged on the console 51. The cross carriage 59 has a longitudinal carriage 62 which is displaceable in the axial direction of the working spindle 11 on guide rods 61 by a hand lever 60. It also has a transverse carriage 64 displaceable on guide rods 64a transversely to the longitudinal carriage 52 by a second hand lever 63. A workpiece stop 65, a longitudinal stop 66, a transverse stop 67 and a hook 68 are further provided, which are overlapped by the snap closure 35 associated with the third mounting surface 9.

The elongated hole drilling device 50 can be mounted only after the protective hood 53 is placed so that covering of the throughgoing openings 12 and 13 is always guaranteed.

Figure 8:
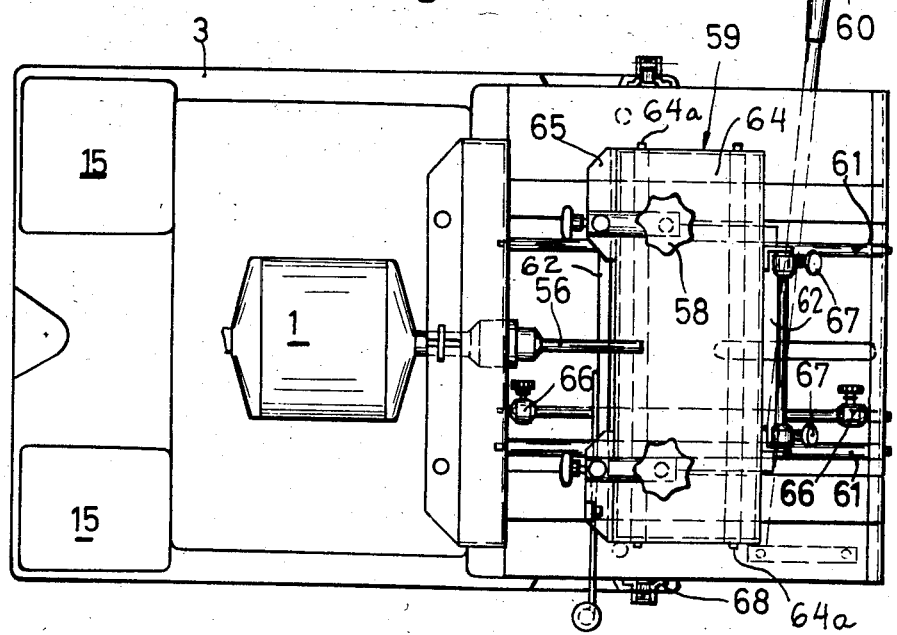
FIG. 8 is a plan view of the base model shown in FIG. 7 and in the region of a drive motor, in a horizontal section.
Figure 9:
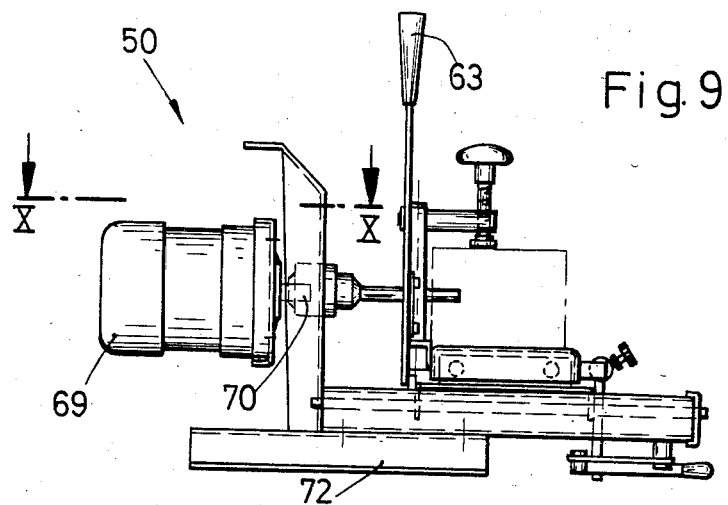
FIG. 9 is a view showing the elongated hole drilling device of FIG. 7, but separated from the base model and provided with its own drive.
Figure 10:
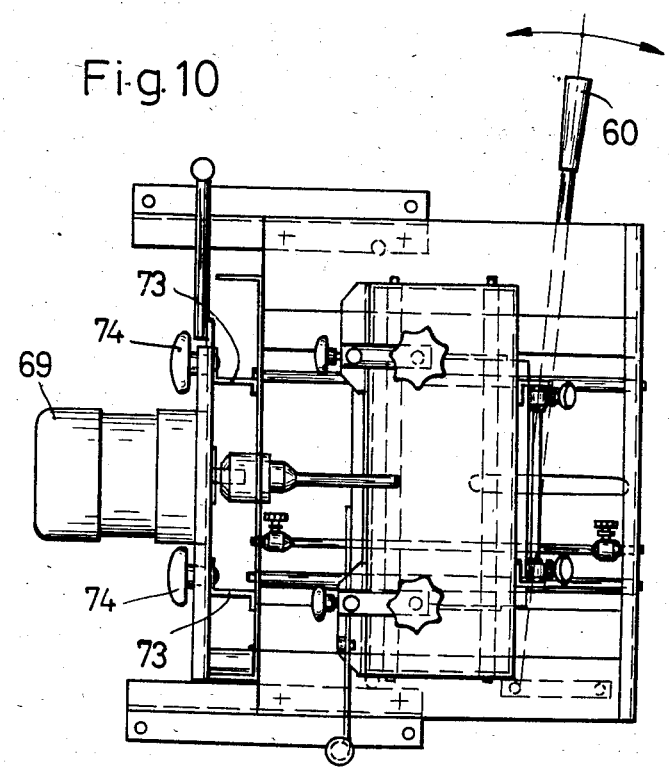
FIG. 10 is a plan view of the elongated hole drilling device of FIG. 9 and partially in section along the line X—X in FIG. 9.

The elongated hole drilling device 50 in FIGS. 7 and 8 can also be used as an independent working aggregate. It is therefore provided with an independent working motor 69 with a working spindle 70, a turnable motor suspension 71 for vertical adjustment, mounting legs 72 and rails 73 on which the aggregate can be fixed by clamping screws 74.

Figure 12:
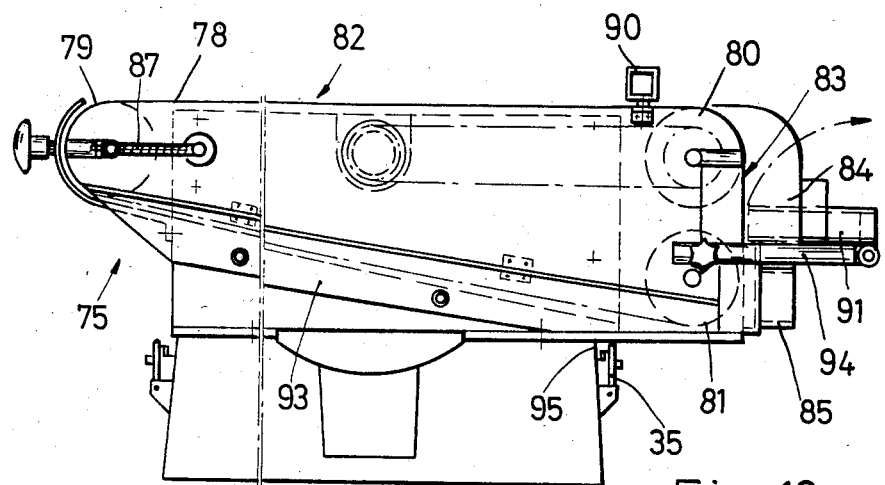
FIG. 12 is a side view of the base model with a belt grinder mounted thereon.
Figure 13:
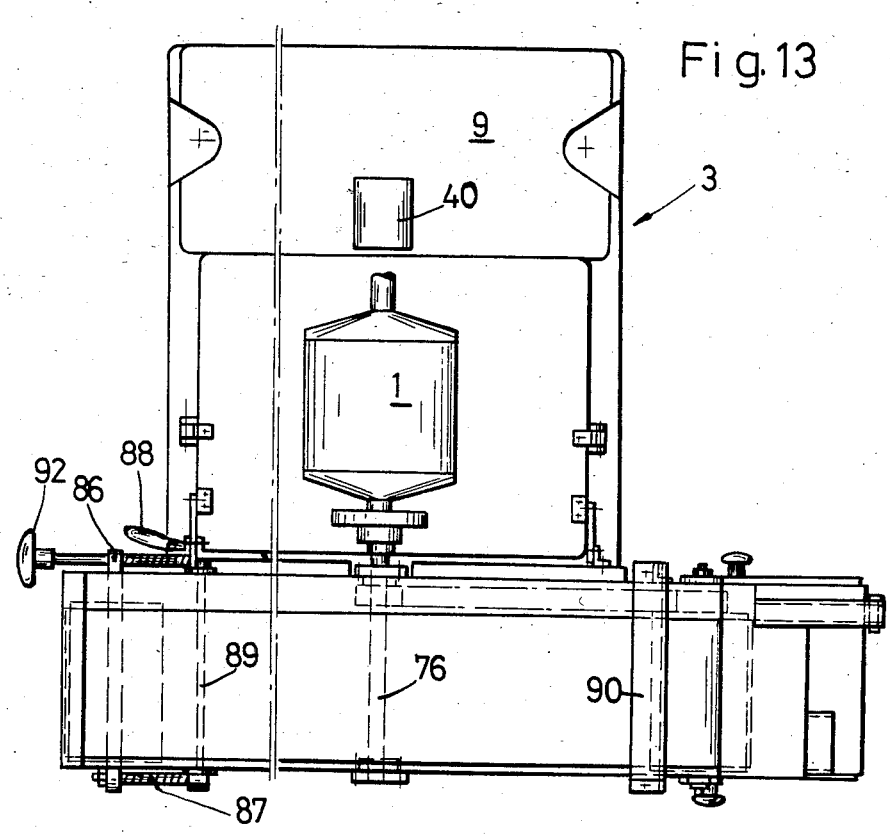
FIG. 13 is a plan view of the base model shown in FIG. 12.

FIGS. 12–14 show a belt grinder 75 mounted on the base model. It lies on the second mounting surface 8 of the base model. As can be seen from FIG. 14, the upper cover plate 54 of the protective hood 53 is articulatedly connected with the belt grinder 75. It extends through the throughgoing opening 13 of the machine housing 3 with an intermediate shaft 76 which is driven from the working spindle 10 of the working motor 1 via a flat belt 77. A grinding belt 78 is guided around an adjustable roller 79 and two immovable rollers 80, 81, and forms a horizontal grinding surface 82 and a vertical grinding surface 83. Suction pipes 84 and 85 are associated with the horizontal grinding surface 82 and the vertical grinding surface 83. A bearing 86 of the adjustable roller 79 is arranged under the action of at least one spring 87 which is releasable by an eccentric 89 actuated by a hand lever 88. A transverse stop 90 is turnable in the region of the horizontal grinding surface 82, and a longitudinal stop 91 is turnable in the region of the vertical grinding surface 83.

The flat belt 77 can be tensioned by the vertical adjustment of the working motor 1. Since the protective hood or its upper cover plate 54 is fixedly connected with the belt grinder 75, the throughgoing openings 12, 14 of the machine housing 3 or the working spindle 11 are closed, on the one hand, by the upper cover 54 and, on the other hand, by the cover 40. By actuating of a screw 92 the belt running can be adjusted. By actuation of the hand lever 88, the grinding belt 78 can be released for belt exchange. A lower closing flap 93 is further provided for covering the lower belt run. For grinding works on the vertical grinding surface 83 a table 94 is provided. The longitudinal stop 91 is articulately connected with the table 94. The suction pipe 84 associated with the horizontal grinding surface 82 is removable, whereas the suction pipe 85 associated with the vertical grinding surface 83 is arranged stationarily. Finally, hooks 95 are provided for snap closures.

Figure 15:
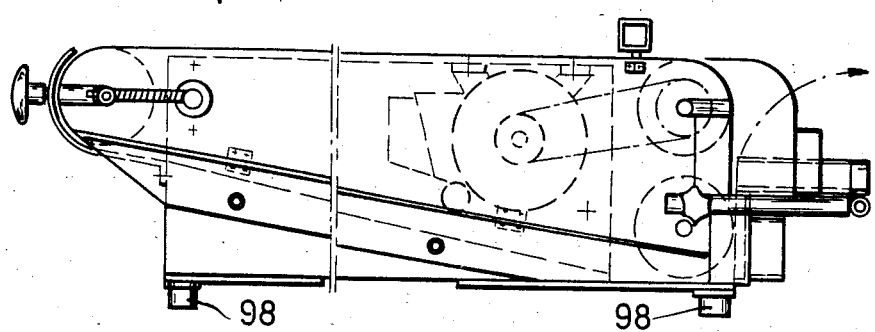
FIG. 15 is a view showing the belt grinder of FIG. 10 formed as an independent working aggregate with its own drive.
Figure 16:
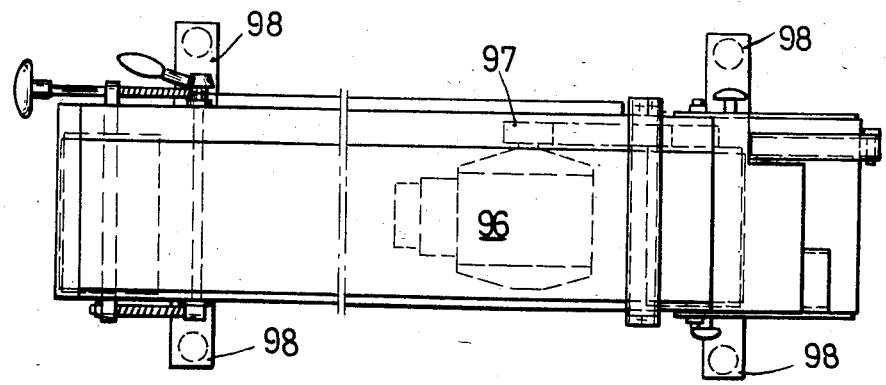
FIG. 16 is a plan view of the belt grinder of FIG. 15.

FIGS. 15–17 show a belt grinder formed as an independent working aggregate. Here the protective hood 53 or the upper cover plate 54 with the cover 40 are not provided. However, it is equipped with an independent working motor 96 with a belt pulley 97 and mounting legs 98.

FIGS. 18 and 19 show a disc grinder 99 mounted on the base model. It has a housing 100 lying on the third mounting surface 9 of the base model. The housing 100 covers the lower half of a grinding disc 101, has here a suction pipe 102, forms in half height of the grinding disc 101 a table 103, overlaps with its upper housing part 108 the upper cover plate 54 of the protective hood, and is here releasably locked. The grinding disc 101 is mounted on the horizontally located working spindle 11 of the working motor 1.

Here also the abovementioned arrangement of the protective hood 53 is required so that the disc grinder 99 can be mounted. The protective hood 53 covers the throughgoing openings 12 and 13 of the machine housing 3.

FIGS. 20 and 21 show the disc grinder 99 as an independent working aggregate with its own working motor 104 with a working spindle 105. Moreover, a motor suspension 106 and mounting legs 107 are provided. The disc grinder 99 can be additionally equipped with a workpiece stop 108 which is adjustable by 45°.

Figure 22:
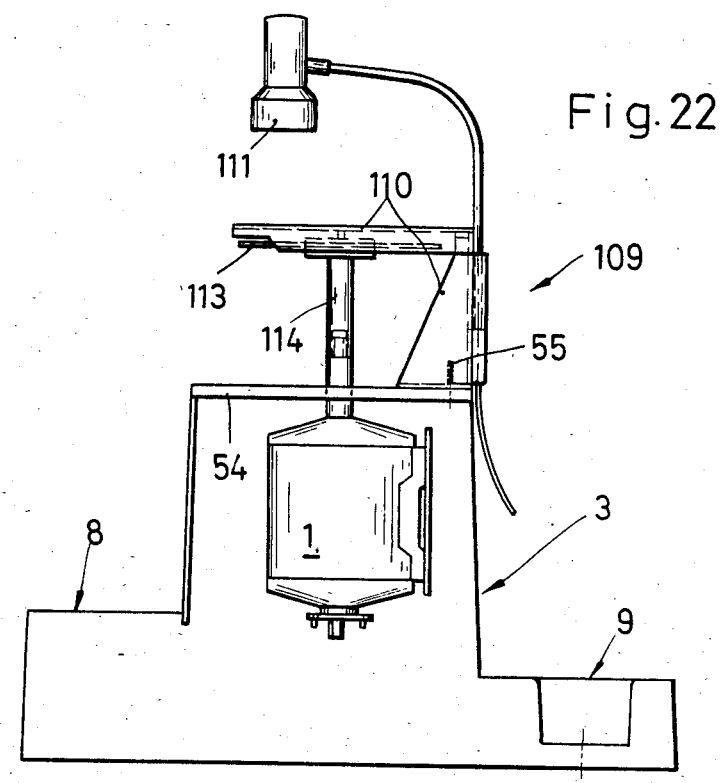
FIG. 22 is an end view showing a visible grinding device mounted on the base model.
Figure 23:
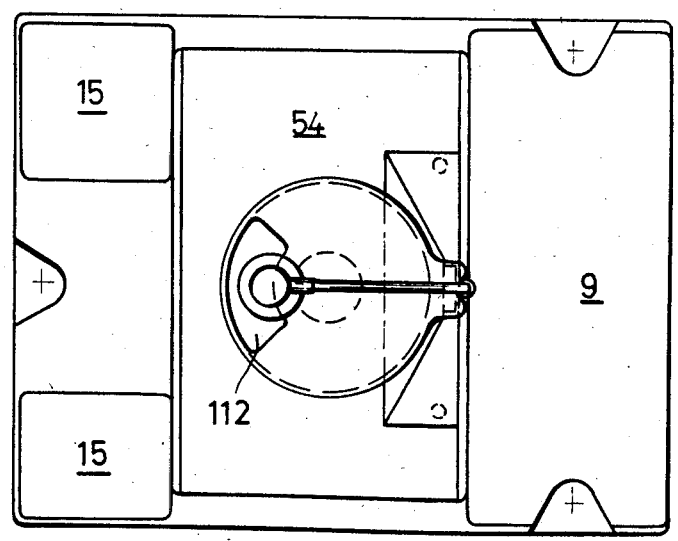
FIG. 23 is a plan view of the base model shown in FIG. 22.

FIGS. 22 and 23 show a grinding device 109 mounted on the base model. The article grinding device 109 supports with its housing 110 on the upper cover plate 54 of the protective hood 53 and is releasably locked with it by a member 55. The housing has a lamp 111 and covers up to the window cutout 112 a horizontal grinding disc 113. The visual grinding disc 113 is mounted via a mandrel 114 on the vertical working spindle 11 of the working motor 1.

Here also mounting of the visual grinding device 109 is possible when before this the protective hood 53 has been mounted. The protective hood 53 closes the throughgoing openings 15, 14 of the machine housing 3 and the upper throughgoing opening 12, till a throughgoing hole for the mandrel 114.

Figure 24:
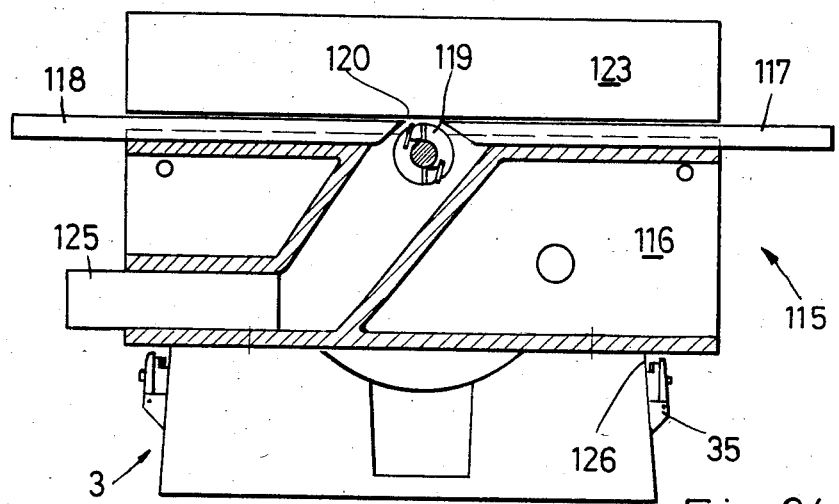
FIG. 24 is a side view of a planing machine mounted on the base model, partially in a longitudinal section.
Figure 25:
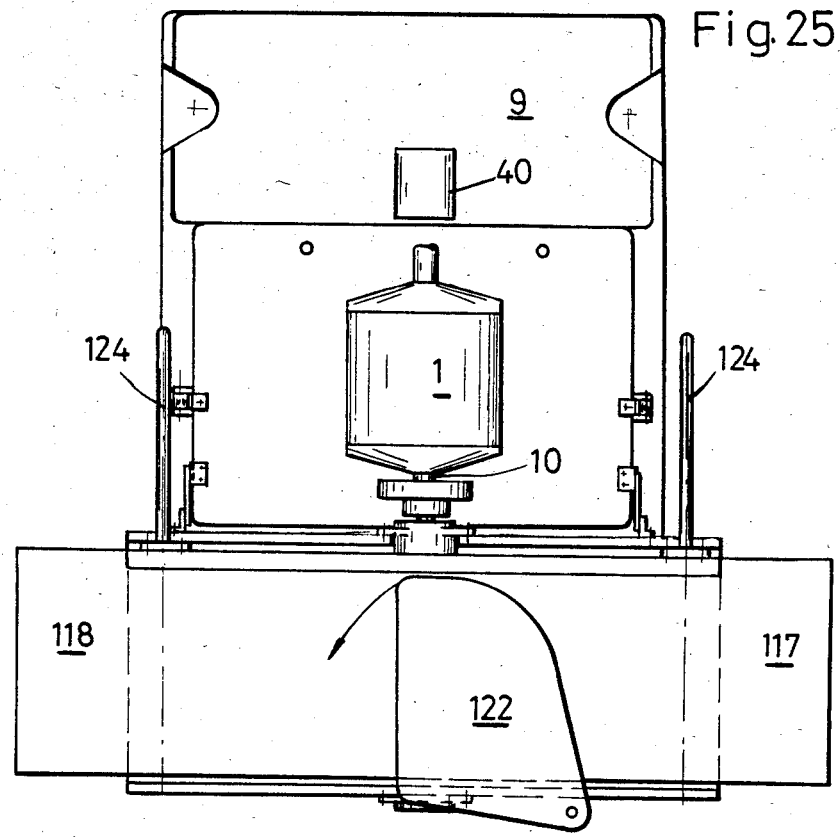
FIG. 25 is a plan view of the base model shown in FIG. 24.
Figure 26:
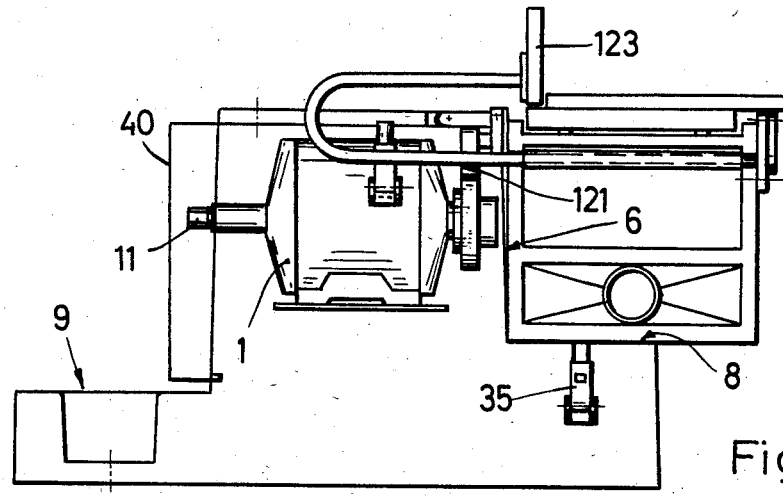
FIG. 26 is an end view from the left side of the base model shown in FIG. 24.

FIGS. 24–26 show a planing machine 115 mounted on the base model. It lies with its housing 116 on the second mounting surface 8 of the base model. The planing machine 115 has a feed table 117, a withdrawal table 118, and a horizontal cutter shaft 119 which extends partially through a working gap 120 of the withdrawal table 117 and is driven via a flat belt 121 by the horizontal working spindle 10 of the working motor 1.

As can be seen particularly from FIG. 26, the protective hood 53 or its upper cover flap 54 is articulately connected with the planing machine 115. The throughgoing openings 12, 14 of the machine housing 3 are closed by the upper cover 54 or the cover 40.

The flat belt 121 is clamped by the vertical displacement of the working motor 1. A turnable protector 122 is articulately connected with the feed table 117 and is turnable in a horizontal plane. Moreover, a parallel stop 123 with guide rods 124, a suction pipe 125, and hooks 126 for the snap closure 35 are provided.

Figure 27:
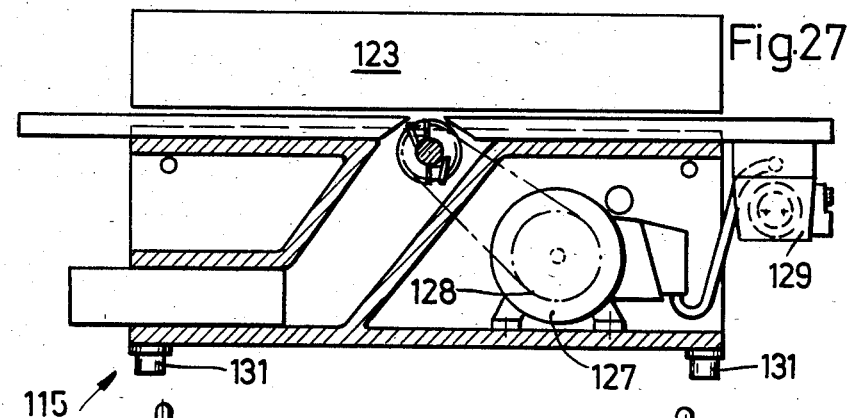
FIG. 27 is a view showing the planing machine of FIG. 24 formed as an independent working aggregate with its own drive.
Figure 28:
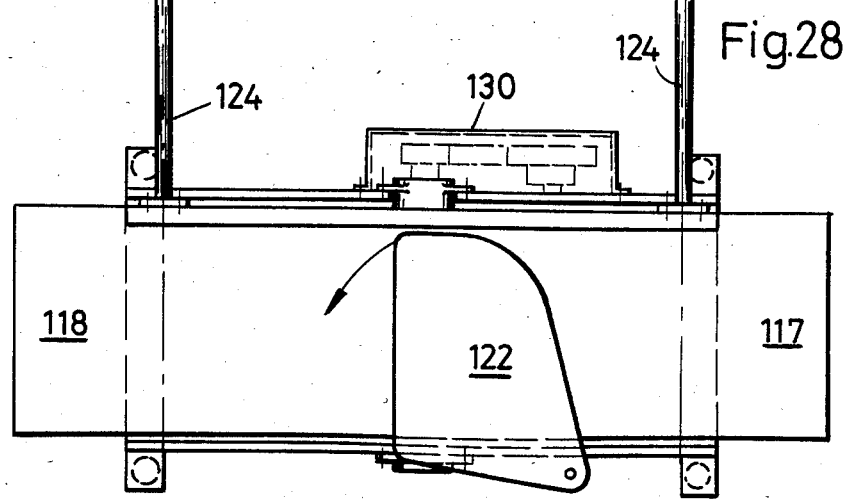
FIG. 28 is a plan view of the planing machine of FIG. 27.
Figure 29:
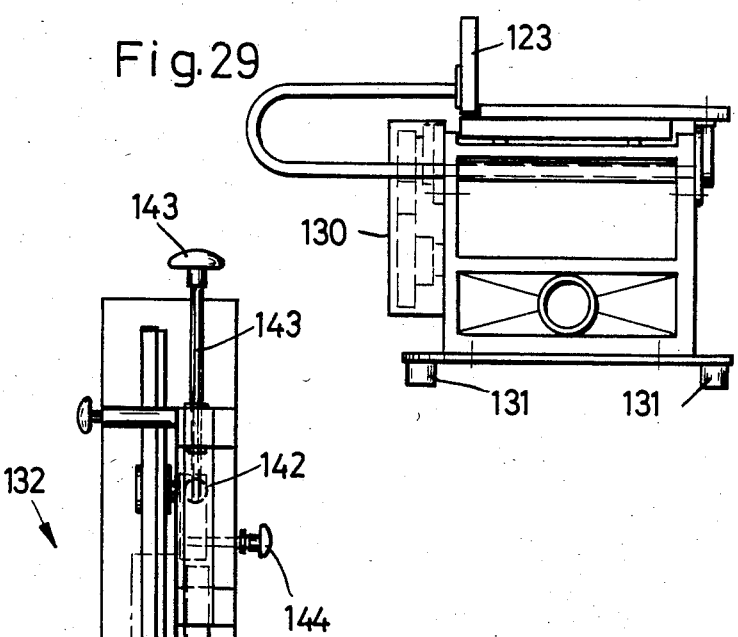
FIG. 29 is a an end view from the left side of the planing machine of FIG. 27.

FIGS. 27–29 show the planing machine 115 formed as an independent working aggregate with its own working motor 127 with a belt pulley 128, a brake-switch-plug combination 129, a protective hood 130, covering the belt drive, and mounting legs 131. The upper cover plate 54 and the cover 40 are not provided here.

Figure 30:
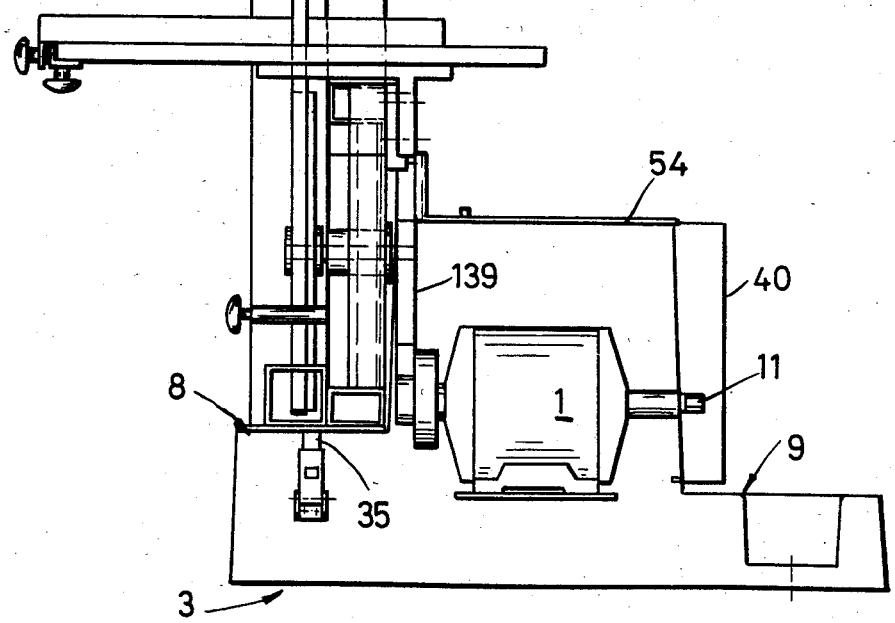
FIG. 30 is an end view of a band saw mounted on the base model and shown partially in vertical section.
Figure 31:
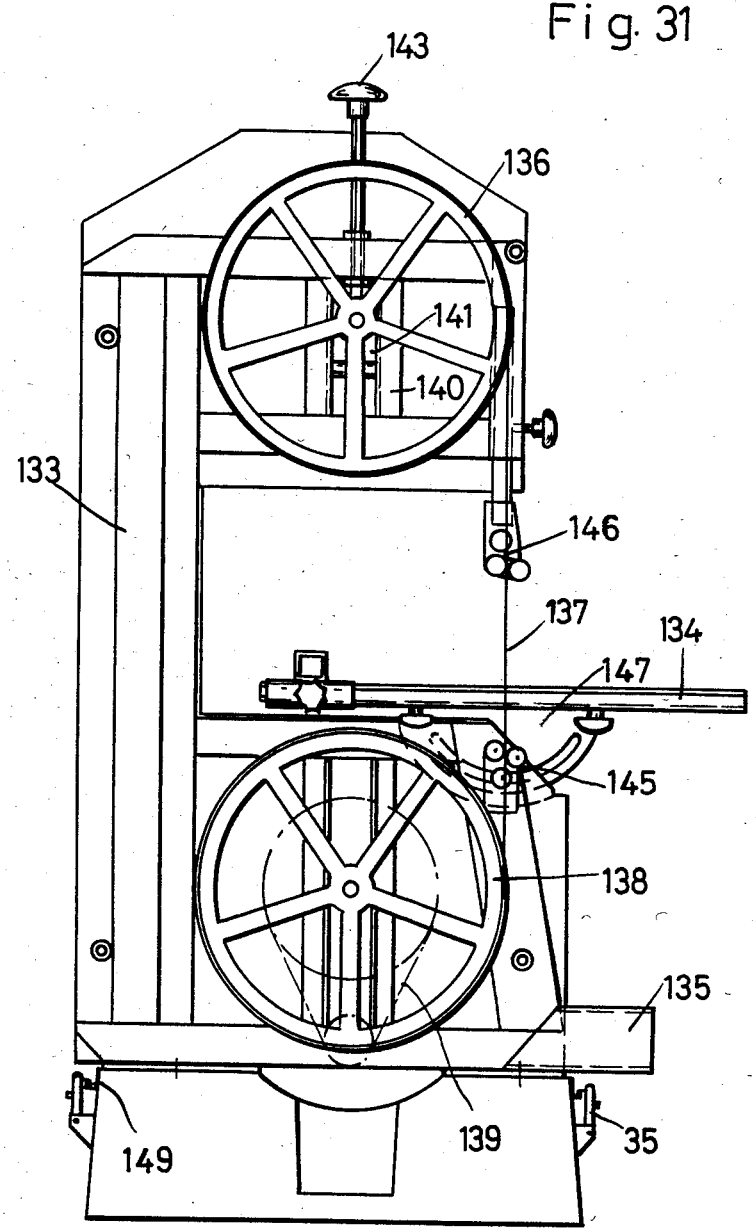
FIG. 31 is a side view of the base model of FIG. 30.

FIGS. 30 and 31 show a band saw 132 mounted on a base model. It lies with its frame housing 133 on the second mounting surface 8 of the base model. The band saw 132 has a saw table 134, a suction pipe 135, an upper adjustable wheel 136 for a saw blade 137, and a lower drive wheel 138 which is driven by the horizontal drive spindle 10 of the drive motor 1 via a flat belt 139. The protective hood 33 and its upper cover plate 54 are mounted on the frame housing 133.

The upper wheel 136 is vertically adjustable and turnable from its vertical plane outwardly. The vertical adjustment is performed with the aid of a guide rail 140 for a U-shaped slider 141 with a turning nut 142, and a spindle 143 adjustable by hand. The abovementioned turning of the upper wheel 134 is performed via a spindle 144 adjustable by hand. A lower saw band guide 145 and an upper vertically adjustable saw band guide 146 are provided for the saw blade 137.

The band saw 132 has further a table console 147 which is turnable from its horizontal plane outwardly and arrests the saw table 134 in the desired position, and hooks 149 for the snap closure 35.

The protective hood 63 covers with its upper cover plate 64 the upper throughgoing opening 12 and the its cover 40 the throughgoing opening 14 of the machine housing 3 or the working spindle 11 of the working motor 1. The flat belt 139 is tensioned by the vertical displacement of the working motor 1.

Figure 32:
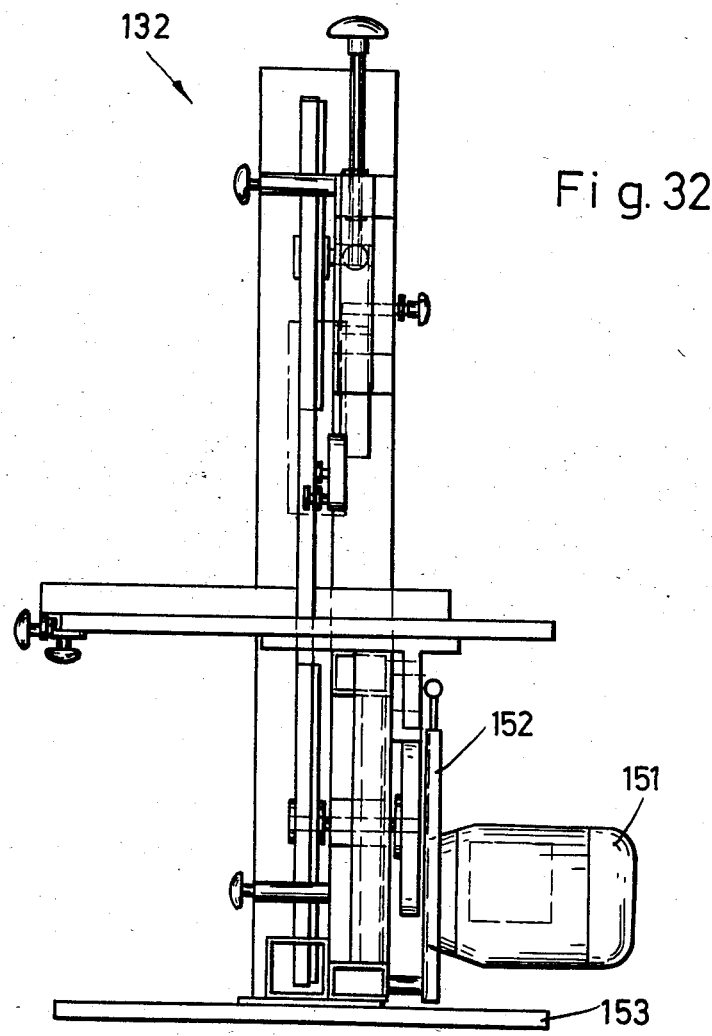
FIG. 32 is a view showing the band saw of FIG. 20 formed as an independent working aggregate with its own drive.
Figure 33:
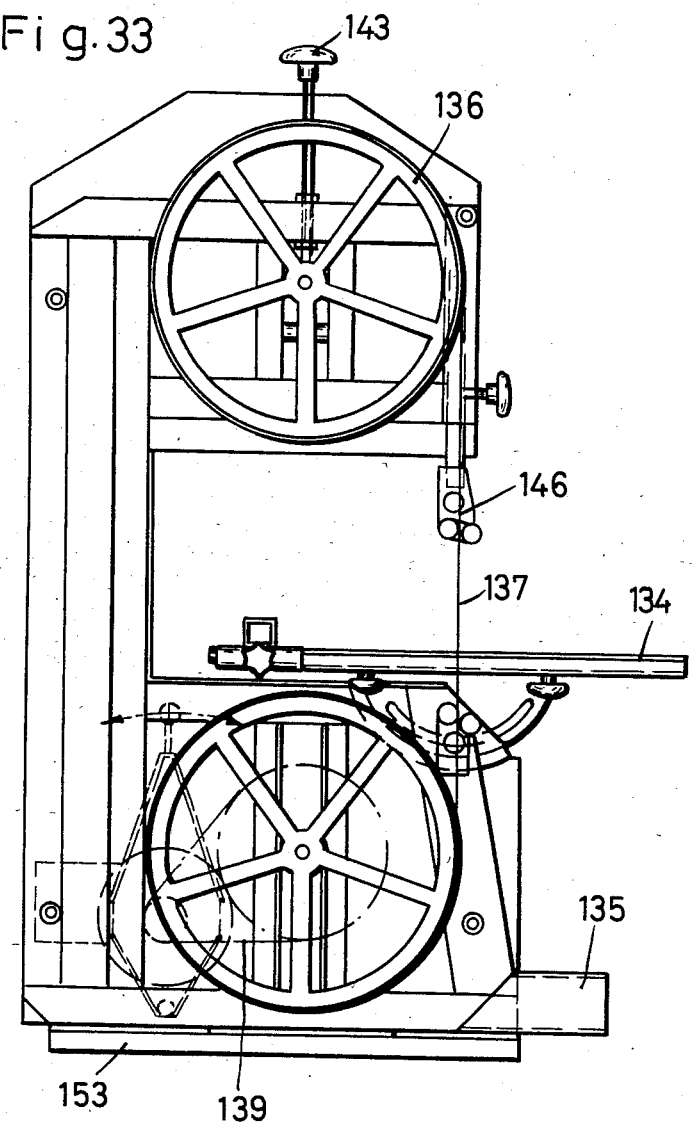
FIG. 33 is a side view of the band saw of FIG. 32.

FIGS. 32 and 33 show the band saw 132 as an independent working aggregate which, however, is not provided with the upper cover plate 54 and the cover 40. Instead, it has its own working motor 151 with the motor suspension 152, and mounting legs 153.

Figure 34:
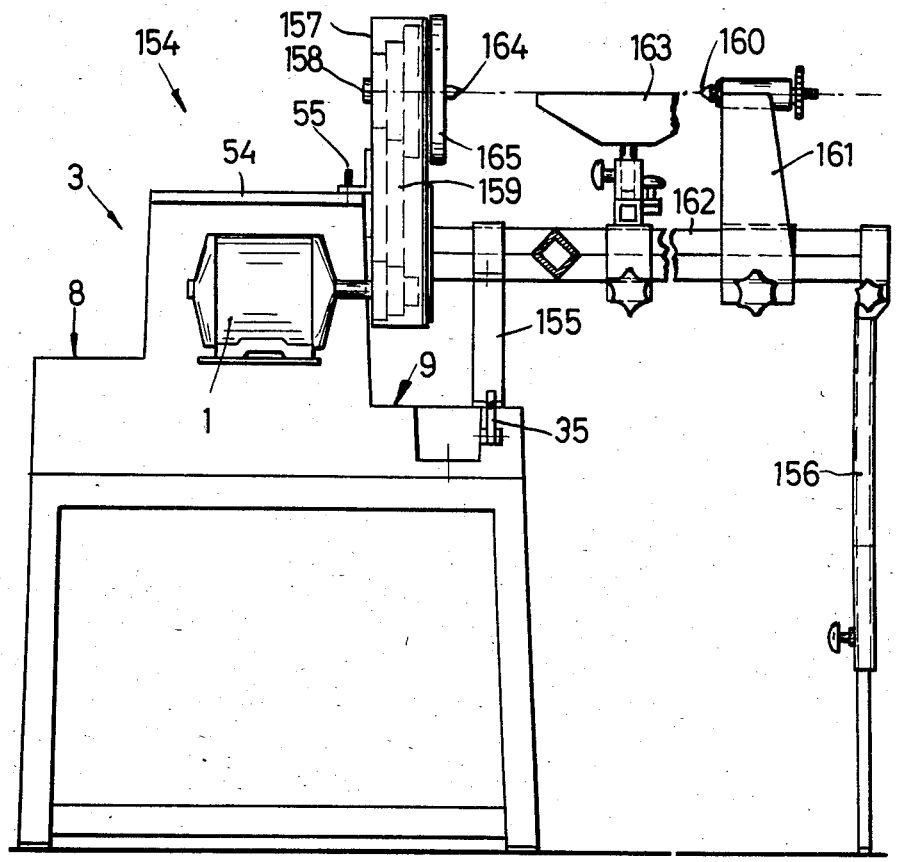
FIG. 34 is an end view showing a turner mounted on the base model and shown partially in a longitudinal section.
Figure 35:
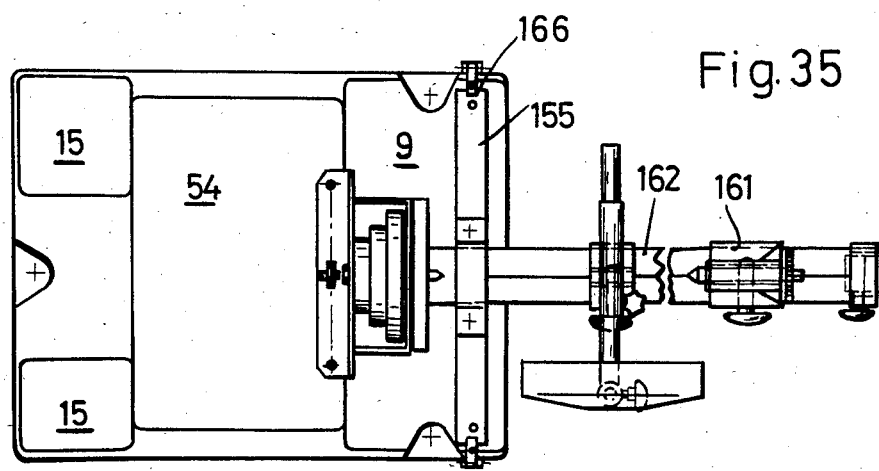
FIG. 35 is a plan view of the base model of FIG. 34.

FIGS. 33 and 34 show a turner 154 mounted on the base model. It is supported with a leg 155 on the third mounting surface 9 of the base model and by a height adjustable support 156 on the floor. The turner 154 has a spindle box 157 which supported on the upper cover plate 54 of the protective hood 53 and is releasably connected therewith by a member 55. In the spindle box 157, a working spindle 158 is supported and driven via a cone belt drive 159 from the working spindle 11 of the working motor 1. The working spindle 158 is in alignment with a co-rotating dead center 160 of a head stock 161. The latter is displaceably and arrestably guided on a horizontal carrier pipe 162 mounted on the spindle box 157. A height adjustable hand support 163 is displaceably and arrestably guided on the carrier pipe 162.

The protective hood 53 covers by its upper cover plate 54 and by its cover 39 the throughgoing openings 12 and 13 in the machine housing 3. Here also the turner 154 is mounted only when before this the protective hood 53 has been placed on.

The working spindle 158 can be selectively equipped with an end driver 164 or a planing disc 165. The leg 155 is provided with a hook 166 for the snap closure 35.

Figure 38:
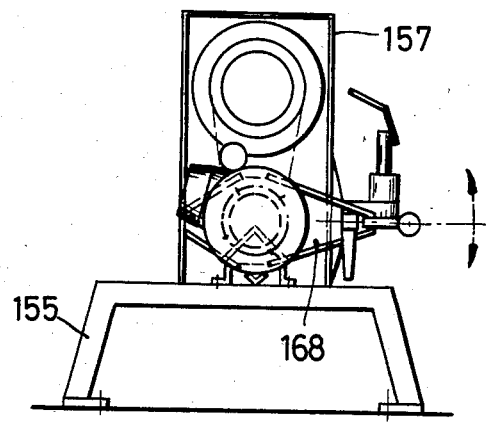
FIG. 38 is an end view from the left side of the the turner of FIG. 36.
Figure 36:
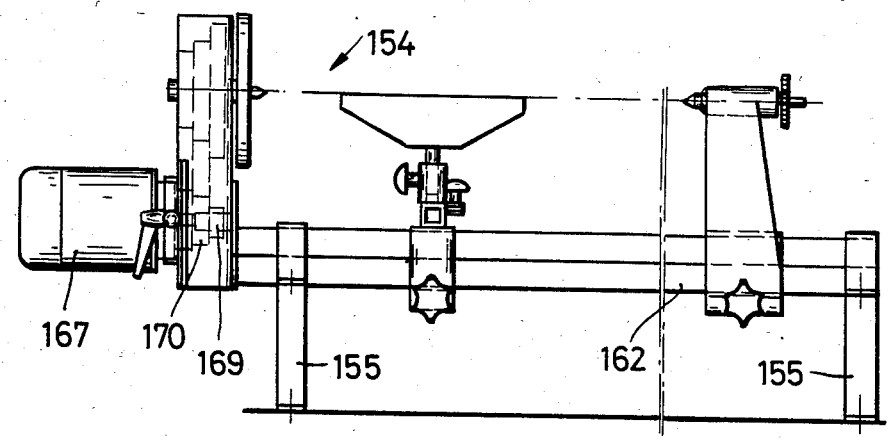
FIG. 36 is a view showing the turner of FIG. 34 formed as an independent working aggregate with its own drive.
Figure 37:
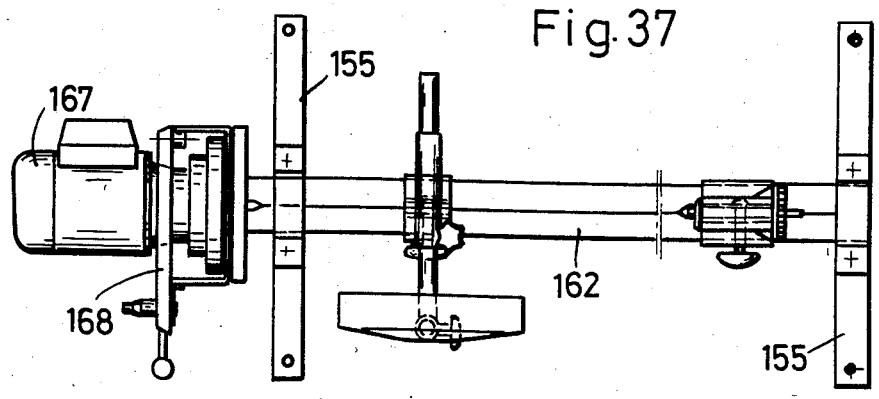
FIG. 37 is a plan view of the turner shown in FIG. 36.

FIGS. 36–38 show the turner 154 as an independent working aggregate. It is provided with its own working motor 167 which is received in a turnable motor suspension 168. A cone belt pulley 170 is seated on a drive spindle 169 of the drive motor 167. The height adjustable support 156 is replaced by a further leg 165.

Regardless of whether in the above described embodiments the individual additional devices or independent working aggregates are used with their own working motor, a brake switch-plug combination is provided, as shown in FIG. 27 with the reference numeral 129.

It will be understood that each of the elements described above, or two or more together, may also find a useful application in other types of constructions differing from the type described above.

While the invention has been illustrated and described as embodied in a universal machine for wood and synthetic plastic working, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A universal machine for wood and/or synthetic plastic working, comprising a working motor having a motor shaft with ends formed as working spindles; means for height adjustment of said working motor; means for turning said working motor from its horizontal position to its vertical position; and a machine housing surrounding said working motor, said machine housing being limited from above by a first horizontal mounting surface and having two oppositely located first lateral walls, and a second horizontal mounting surface and a third horizontal mounting surface each associated with one of said lateral walls and located lower than said first horizontal mounting surface, said three mounting surfaces being integral components of said machine housing; a plurality of openings each provided in a lateral wall associated with said third mounting surface and in said first mounting surface, respectively, so that one of said working spindles in vertical or horizontal position of said working motor can extend therethrough, and another opening provided in a lateral wall facing toward said second mounting surface and being in alignment with the other horizontally located working spindle; centering means provided at least on said first and second mounting surfaces of said machine housing; a protective hood releasably mounted on said centering means; and at least one exchangeable independent working device releasably mountable on said centering means.

2. A universal machine as defined in claim 1, wherein said working device is arranged so that it uses at least one of said openings, said protective hood including an upper cover plate abutting against said first mounting surface, and covers for those of said openings which are not used by the respective working device and for the respective one of said working spindles extending through said not used openings.

3. A universal machine as defined in claim 1; and further comprising a snap closure provided on each of said mounting surfaces for fixing said protective hood or a respective one of said working devices.

4. A universal machine as defined in claim 1, wherein said first lateral walls extend at an approximately right angle to the respective associated mounting surfaces.

5. A universal machine as defined in claim 1, wherein said second mounting surface is located higher than the third mounting surface of said machine housing.

6. A universal machine as defined in claim 1, wherein said second mounting surface has two surface portions and a circular segment-shaped recess which is formed as one of said throughgoing openings in the associated one of said lateral walls for receiving a part of said working device, said working device being a circular saw and said part of said working device being a circular saw blade extending through said circular segment-shaped recess.

7. A universal machine as defined in claim 1, wherein said second and third mounting surfaces have vertical depressions provided with bottom holes.

8. A universal machine as defined in claim 1, wherein the throughgoing openings provided in the lateral wall associated with said third mounting surface for the working spindle is formed as a vertical elongated hole.

9. A universal machine as defined in claim 1, wherein said machine housing has a lower cover, and a suction pipe arranged thereover for dust and chips withdrawal.

10. A universal machine as defined in claim 1, wherein said turning means for said working motor is turnable about a horizontal turning axis extending normal to said motor shaft, so that said working motor can be turned about said turning axle by at least 135° in a stepless manner and arrested in a desired turning position.

11. A universal machine as defined in claim 1, wherein said height adjustment means for said working motor include two vertical spindles arranged in the region of said second lateral walls and drivable synchronously, two guide rods extending parallel to said vertical spindles, and a motor receiving element height-adjustably guided on said guide rods.

12. A universal machine as defined in claim 11; and further comprising a drive for said vertical spindles and including a hand wheel supported in said second lateral walls and two bevel gear pairs.

13. A universal machine as defined in claim 1; and further comprising blocking means arranged for fixing said working motor in a respective height position and including a clamping hand wheel.

14. A universal machine as defined in claim 1; and further comprising a motor receiving member provided with a guide roll, a gap wedge holder releasably blocking said gap wedge holder.

15. A universal machine as defined in claim 1; and further comprising a reinforced bearing bracket with are inforced supporting part and arranged so that in a vertical position of said motor shaft said working spindle extending through said mounting surface is supported in said reinforced bearing bracket.

16. A universal machine as defined in claim 1, wherein said machine housing formed as a double synthetic plastic shell with a synthetic plastic material foamed therebetween.

17. A universal machine as defined in claim 2; and further comprising a sawing and milling table arranged on said first mounting surface and simultaneously forming said cover plate of said protective hood, said sawing and milling table having a cover for said circular segment-shaped recess associated with said circular saw blade and a cover for the working spindle extending from the opposite lateral wall.

18. A universal machine as defined in claim 17, wherein said sawing and milling table has changeable throughgoing openings for said working spindle, said circular saw blade or a milling tool.

19. A universal machine as defined in claim 17, wherein said sawing and milling tool has a turnable upper cover for the circular saw blade, said upper cover being turnable about a horizontal longitudinal axis so as to correspond to any inclined position of the circular saw blade.

20. A universal machine as defined in claim 17; and further comprising a mill protective hood releasably mounted on said sawing and milling table.

21. A universal machine as defined in claim 20, wherein said mill protecting hood has a suction pipe for a dust and chips withdrawal.

22. A universal machine as defined in claim 18, wherein said sawing and milling table has a mill protective hood, said mill protective hood having a lower hood part extending in the throughgoing opening of said sawing and milling table and an upper hood part displaceable relative to said hood part for adjustment relative to the milling tool.

23. A universal machine as defined in claim 17, wherein said sawing and milling table has a receiving member for a parallel stop, and a guide for a miter ruler.

24. A universal machine as defined in claim 2, wherein said working device is an elongated hole drilling device having a console with which it is mounted on said third mounting surface, said elongated hole drilling device having a hood overlapping said upper cover plate of said protective hood, said hood having an opening, and said elongated hole drilling device having a drill and a drill chuck which is mounted on the horizontally located working spindle of said working motor and extends through said recess of said hood.

25. A universal machine as defined in claim 24; and further comprising a cross carriage provided with a workpiece clamp and arranged on said console, said cross carriage having a longitudinal carriage displaceable in one axial direction of said working spindle and a transverse carriage displaceable transversely to said axial direction, and hand levers arranged to displace said longitudinal carriage and said transverse carriage.

26. A universal machine as defined in claim 2, wherein said working device is a belt grinder arranged on said second mounting surface and having an intermediate shaft, said belt grinder being fixedly connected with said upper cover plate of said protective hood and said intermediate shaft extending through one of said throughgoing openings of said machine housing, said belt grinder also having a transmission belt arranged to drive said intermediate shaft from said working spindle of said working motor.

27. A universal machine as defined in claim 26, wherein said belt grinder has a grinding belt, and one adjustable and two removable rollers around which said grinding belt is guided so as to form a horizontal grinding surface and a vertical grinding surface, said belt grinder also having a suction pipe associated with a respective one of said grinding surfaces.

28. A universal machine as defined in claim 27, wherein said belt grinder further has a bearing for said adjustable roller, a spring acting upon said bearing, an eccentric arranged to release said spring, and a hand lever acting upon said eccentric.

29. A universal machine as defined in claim 27, wherein said belt grinder further has a transverse stop turnable in the region of said horizontal grinding surface, and a longitudinal stop turnable in the region of said vertical grinding surface.

30. A universal machine as defined in claim 2, wherein said working device is a disc grinder arranged on said third mounting surface and having a grinding disc and a housing which covers a lower half of said grinding disc, is provided in the region of the lower half with a suction pipe, forms in a half height of said grinding disc a table, has an upper housing part which overlaps said upper cover plate of said protective hood and is releasably locked therewith, said grinding disc being mounted on the horizontally located working spindle of said working motor.

31. A universal machine as defined in claim 2, wherein said working device is a visible grinding device which has a horizontal visible grinding disc and a housing supported on said cover plate of said protective hood, said housing of said visible grinding device having a lamp and a window cutout and covering said horizontal visible grinding disc to said window cutout, said visible grinding device also having a mandrel which mounts said visible grinding disc on the vertical working spindle of said working motor.

32. A universal machine as defined in claim 2, wherein said working device is a planing machine having a houing supported on said second mounting surface, a feeding table provided with a working gap and a withdrawal table, and a horizontal rotary cutter partially extending through said working gap of said feeding table, said planing machine having a belt by which said rotary cutter is driven from the horizontal working spindle of said working motor, said protective hood being articulately connected with said housing of said planing machine.

33. A universal machine as defined in claim 2, wherein said working device is a band saw having a frame housing supported on said second mounting surface, a saw table, a suction pipe, a saw blade, an upper adjustable wheel for said saw blade, a lower drive wheel, and a belt through which said lower drive wheel is driven from the horizontal working spindle of said working motor, said protective hood being mounted with its upper cover plate on said frame housing.

34. A universal machine as defined in claim 33, wherein said upper wheel is vertically adjustable and turnable outwardly from its vertical plane.

35. A universal machine as defined in claim 33, wherein said saw table is turnable from its horizontal plane outwardly and arrestable in a desired position.

36. A universal machine as defined in claim 2, wherein said working device is a turner having a leg supported on said third mounting surface and a vertically adjustable support supported on a floor, said turner having a spindle box supported on said upper cover plate of said protective hood and releasably locked therewith, and a turner working spindle provided in said spindle box, a belt drive arranged to drive said turner working spindle from the working spindle of said working motor, a head-stock provided with a co-rotating dead center with which said turner working spindle is in alignment, and a horizontal carrier pipe mounted on said spindle box and arranged so that said head-stock is displaceably and arrestingly guided on said carrier pipe.

37. A universal machine as defined in claim 36, wherein said turner further has a height-adjustable hand support which is displaceably and arrestingly guided on said carrier pipe.

* * * * *

UNITED STATES PATENT AND TRADEMARK OFFICE
CERTIFICATE OF CORRECTION

PATENT NO.   : 4 598 744
DATED        : July 8, 1986
INVENTOR(S)  : ANTONIE BONS, ERWIN RAABE It is certified that error appears in the above—identified patent and that said Letters Patent is hereby corrected as shown below:

On the title page, the name of the assignee should read:

STEPHAN-WERKE GMBH & CO.

Signed and Sealed this

Tenth Day of February, 1987

*Attest:*

DONALD J. QUIGG

*Attesting Officer*    *Commissioner of Patents and Trademarks*